UNITED STATES PATENT OFFICE.

PAUL EMILE PLACET, OF PARIS, FRANCE.

PURIFICATION OF ALUMINIUM.

SPECIFICATION forming part of Letters Patent No. 600,268, dated March 8, 1898.

Application filed December 24, 1896. Serial No. 616,920. (No specimens.) Patented in France July 24, 1896, No. 258,322.

*To all whom it may concern:*

Be it known that I, PAUL EMILE PLACET, of Paris, in the Republic of France, have invented a new and useful Improvement in the Purification of Aluminium, (for which I have obtained a patent in France, No. 258,322, dated July 24, 1896,) of which the following is a specification.

The aluminium which is found in commerce is never pure. It contains carbon, iron, silicium, sodium, nitrogen, and other impurities, which notably affect its properties.

Heretofore the principal agent employed for the purification of aluminium has been nitrate of potassium. This salt does not give a satisfactory result. It attacks all the vessels in which the metal is melted and by reason of its decomposition it introduces into the aluminium hurtful bodies, which render the aluminium more alterable and diminishes its resistance.

My process presents a double advantage. Not only does it permit the elimination of the impurities from the aluminium, but it permits at the same time by the same operation the introduction into the aluminium of bodies which ameliorate its properties and increase its mechanical resistance to tension, compression, and torsion, as well as its chemical resistance to the action of acids, alkalies, and corrosive gases. I obtain this result by treating aluminium with bichromate salts, which not only disengage by a simple heat the oxygen, which burns and constantly eliminates the impurities, such as hereinbefore described, of the aluminium, but are also incapable by their decomposition of introducing into the aluminium any bodies but those which ameliorate its properties.

I operate as follows: In a crucible or furnace lined internally with magnesia or other suitable matter I place the melted aluminium in contact with bichromate of potassium, for example, and I agitate the mixture forcibly. The heat first melts the bichromate and then decomposes it. The oxygen which is disengaged burns and oxidizes the impurities contained in the aluminium. The carbon becomes carbonic oxid, which escapes to the air. The iron becomes oxid of iron. The silicium becomes silica. The sodium, which is in very small quantity, becomes soda, which is combined immediately with a small fraction of the aluminium oxid due to the presence of air to form aluminate of sodium. These three latter bodies are collected and retained by the flux in the form of scoriæ. As to the nitrogen, it becomes oxid of nitrogen, which escapes to the air. When the reaction is terminated, I add, in case it is necessary, a flux (chlorids, chromates, fluorids, or others,) which collects and retains the scoriæ formed. If this operation is performed with rapidity, the aluminium thus purified contains but a very small quantity of chromium which, far from being injurious, on the contrary, ameliorates its quality. If the operation is performed slowly, the purified aluminium contains greater or less quantities of chromium, according as the operation has lasted a longer or shorter time. This aluminium, purified and containing chromium, serves for making alloys with other metals or for refining wrought or cast iron, steel, nickel, copper, or other metals in which it is desired to introduce at the same time a certain quantity of chromium.

Instead of bichromate of potassium, indicated as above described as an example, I may employ as the equivalent thereof bichromate of sodium, bichromate of ammonia, the bichromates of magnesia, lime, alumina, or mixtures of those bichromates.

I may also employ as equivalents bichromates of manganese, of nickel, of copper, of zinc, of molybdenum, &c., when the aluminium purified with these salts is intended to serve for making alloys containing manganese, nickel, copper, zinc, or molybdenum, &c.

The addition of flux, as I have above indicated, to eliminate the scoriæ is advantageous in certain cases, but it is not indispensable. For example, when the bichromate of potassium is employed, as in the example above described, this salt is decomposed by heat into oxygen, sesquioxid of chromium, and neutral chromate of potassium. This neutral chromate of potassium is indecomposable by heat and is liquid at that temperature. It may in this case itself serve as a flux for collecting and retaining the scoria which is formed by it.

To agitate forcibly the melted aluminium and bichromate salt employed in order to bring each molecule of aluminium in contact with the oxygen which is to purify it, I make use of a crucible, in which I place an agitator, of metal or earthenware, covered with a coating of magnesia, lime, or alumina, &c.

What I claim as my invention is—

The process hereinabove described for the purification of aluminium consisting in agitating the aluminium in a melted condition in contact with a bichromate salt, substantially as herein specified.

In witness whereof I have hereunto set my hand in the presence of two subscribing witnesses.

PAUL EMILE PLACET.

Witnesses:
J. ALLISON BOWEN,
ALCIDE FABE.